Feb. 6, 1962   F. SECRETAN   3,020,485
DIGITAL PHASE-PULSE DEMODULATOR
Filed Oct. 24, 1958   8 Sheets-Sheet 1
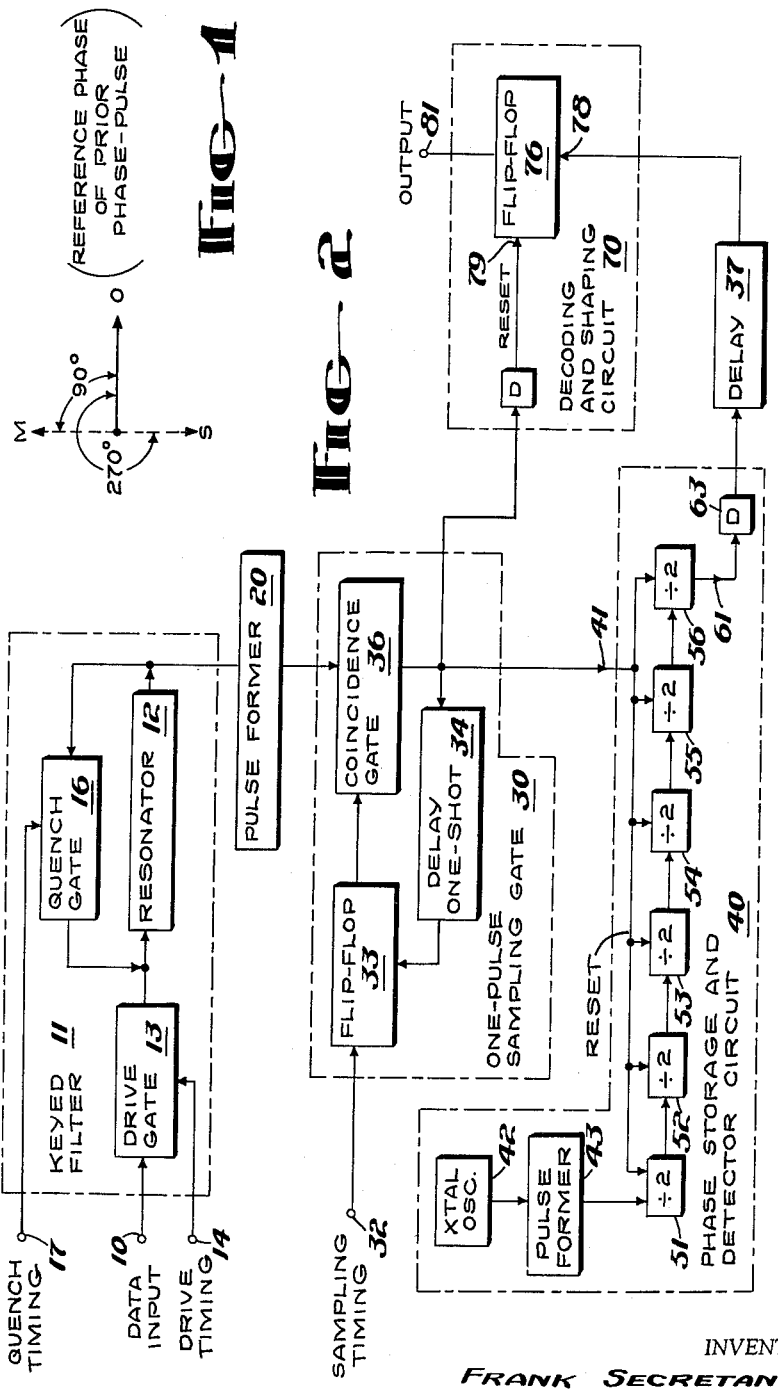
INVENTOR.
FRANK SECRETAN
BY Moody and Goldman
ATTORNEYS Feb. 6, 1962   F. SECRETAN   3,020,485
DIGITAL PHASE-PULSE DEMODULATOR
Filed Oct. 24, 1958   8 Sheets-Sheet 3

INVENTOR.
FRANK SECRETAN
BY Moody and Goldman
ATTORNEY

Feb. 6, 1962  F. SECRETAN  3,020,485
DIGITAL PHASE-PULSE DEMODULATOR
Filed Oct. 24, 1958  8 Sheets-Sheet 4

INVENTOR.
FRANK SECRETAN
BY Moody and Goldman
ATTORNEYS

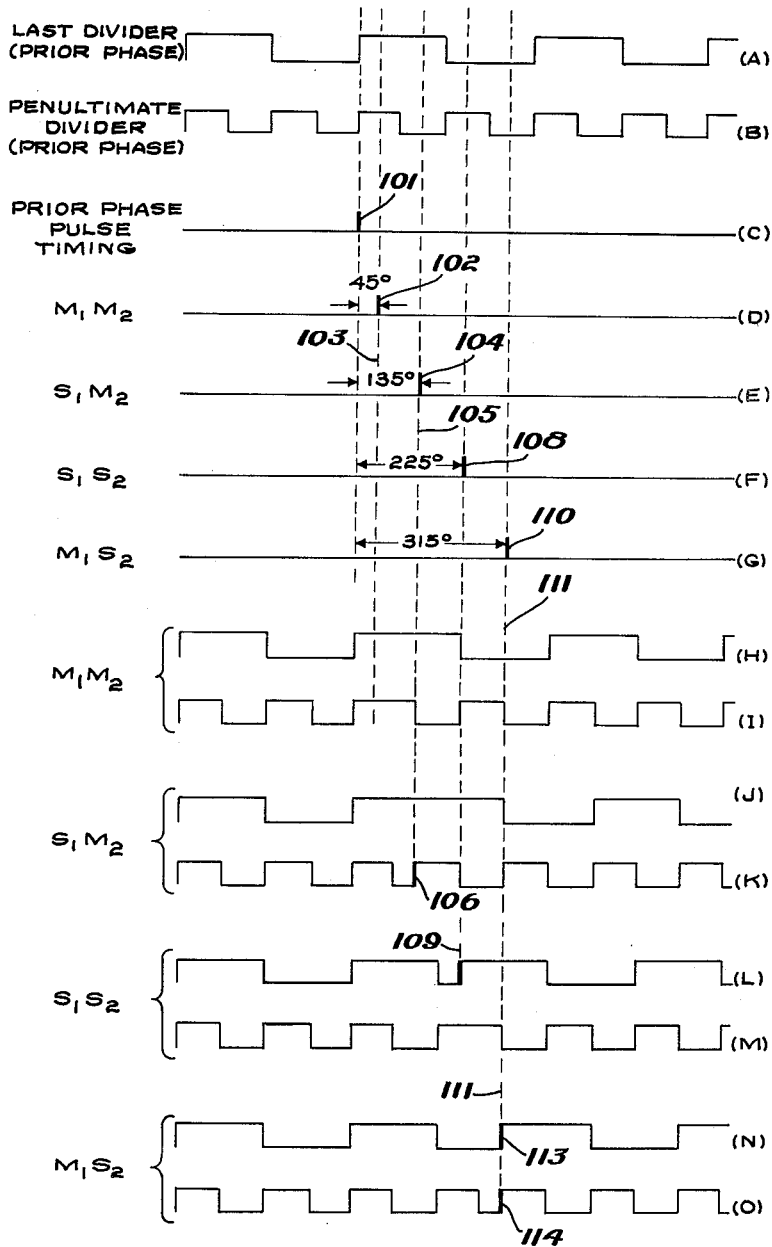

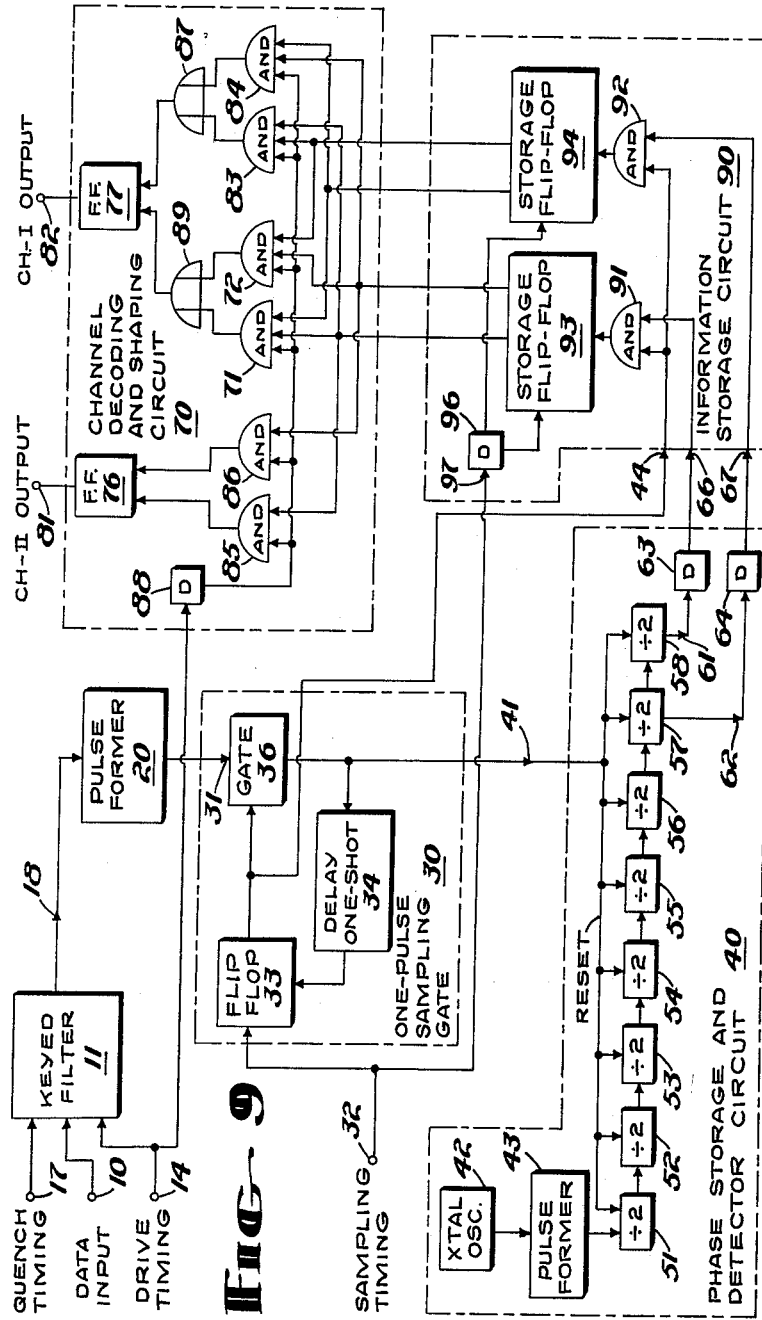

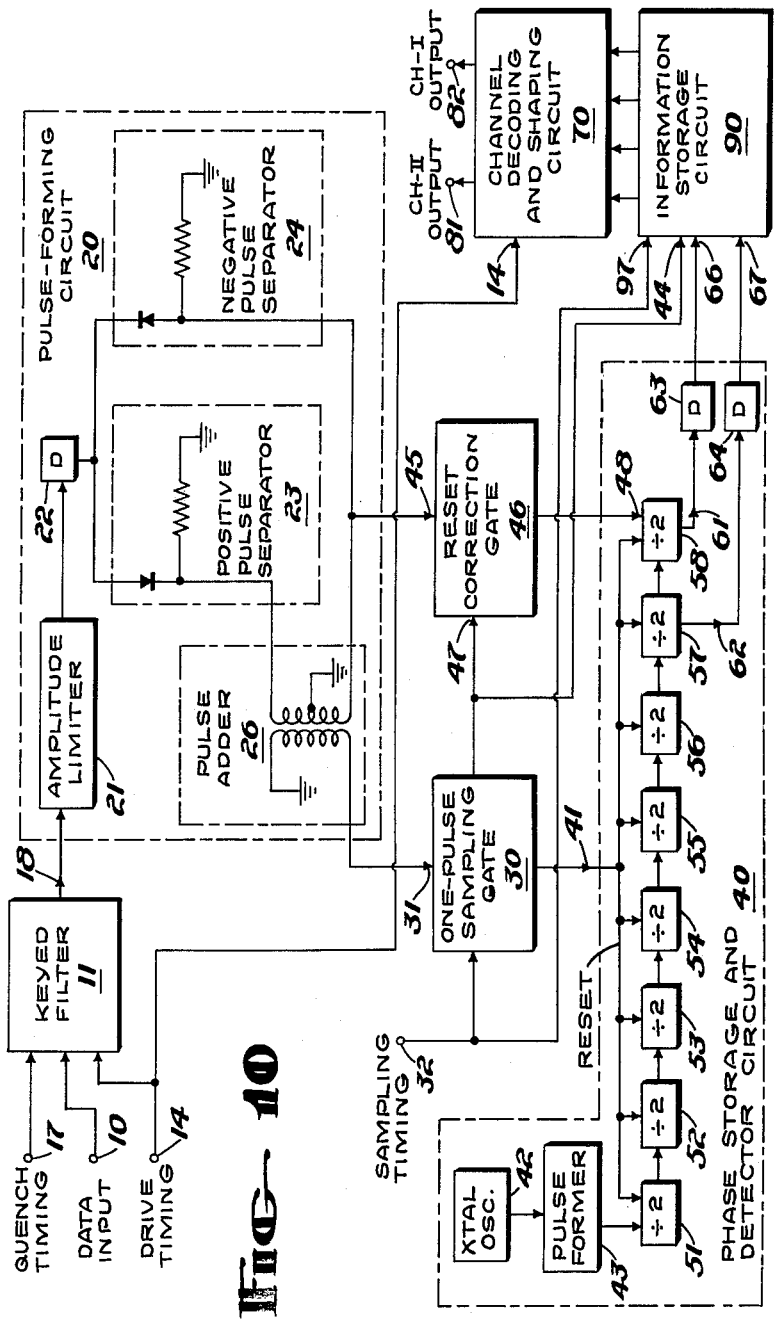

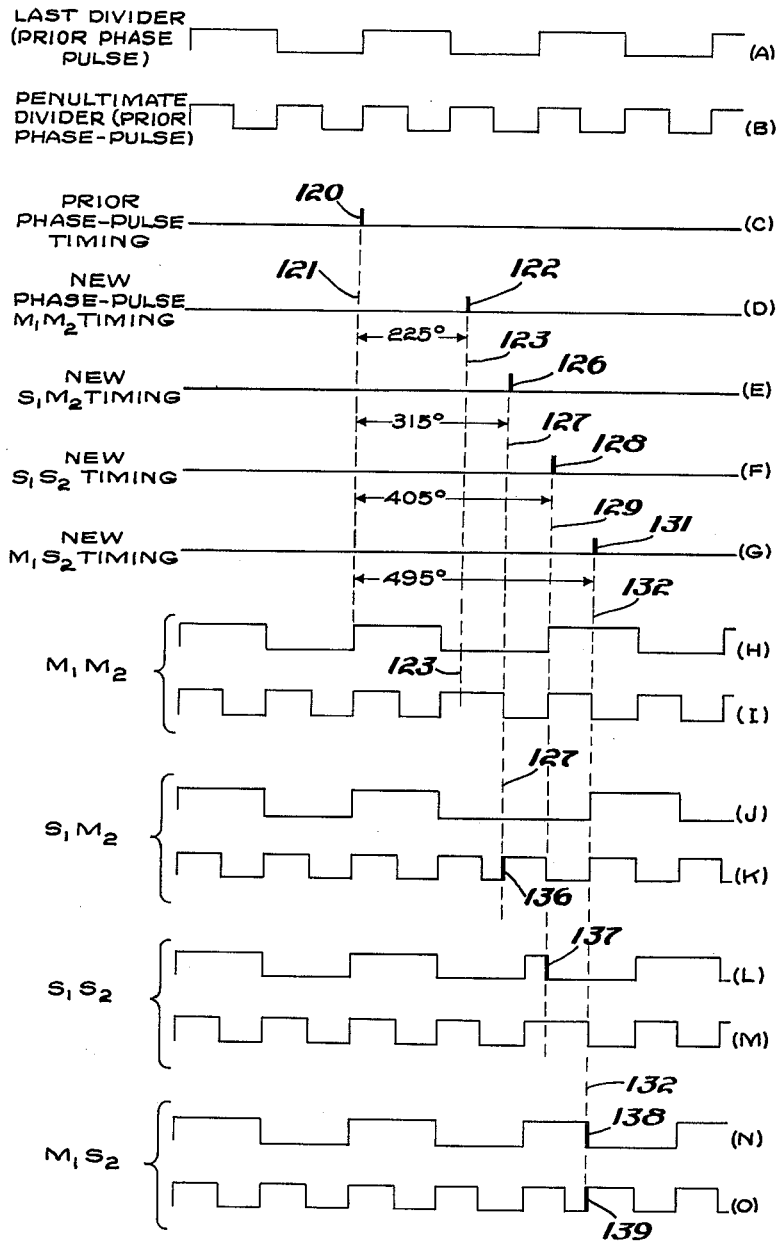

United States Patent Office 3,020,485
Patented Feb. 6, 1962

1

3,020,485
DIGITAL PHASE-PULSE DEMODULATOR
Frank Secretan, Los Angeles, Calif., assignor to Collins
Radio Company, Cedar Rapids, Iowa, a corporation of
Iowa
Filed Oct. 24, 1958, Ser. No. 769,452
18 Claims. (Cl. 329—104)

This invention relates to demodulators of phase-pulse information; which can be generated by many different means, such as given in the follownig applications and patents (all assigned to the same assignee as the present application): Patent No. 2,676,245 titled "Polar Communication System" by Melvin Doelz, issued April 20, 1954; Patent No. 2,833,917 titled "Locking Oscillator Phase-Pulse Generator" to Dean F. Babcock, issued May 6, 1958; patent application Serial No. 716,206 titled "Data Phase Coding System" by Frank Delaney filed February 19, 1958; patent application Serial No. 626,493 titled "Phase-Pulse Generator" by George Barry, filed December 5, 1956; patent application Serial No. 633,143 titled "Matrix Controlled Phase-Pulse Generator" by Dean F. Babcock, filed January 8, 1957; and Patent No. 2,905,-812 titled "High Information Capacity Phase-Pulse Multiplex System" by Melvin L. Doelz and Dean F. Babcock, filed April 18, 1955.

A prior phase-pulse demodulator is taught in the above-mentioned patent application titled "High Information Capacity Phase-Pulse Multiplex System." Briefly, such a demodulator has two keyed filters which accept alternately received phase-pulses. The keyed filter component is described in Patent No. 2,825,808 to Melvin L. Doelz and Earl T. Heald, issued March 4, 1958, titled "Keyed Filter" and assigned to the same assignee as the present application. Each phase-pulse is integrated in a keyed filter, which also stores the phase of the integrated pulse for the next-following pulse period by allowing the filter to ring for that period. The outputs of the keyed filters are simultaneously applied to two phase detectors, which may be conventional, but 90° phase-shifts are provided at the inputs of one of the phase detectors. The 90° phase shift allows decoding into respective channels for two independent channels simultaneously modulated on a given received tone. The output polarities of both phase detectors are momentarily sampled at the end of each phase-pulse period T to obtain maximum signal-to-noise ratio and to avoid interchannel cross-talk theoretically. The synchronously sampled polarities contain the demodulated information of the received phase pulses. Sampling means for the prior demodulator is taught in Patent No. 2,905,837 titled "Detector Sampling Means" by George Barry, filed July 26, 1957 and assigned to the same assignee as the present application.

However, some crosstalk was found in practice with such a prior phase-pulse demodulator, because of the time constant required in low-pass filters at outputs of its two component phase detectors. The low-pass filters caused retention of some binary information from bit to bit, which resulted in a cross-talk effect.

It is an object of this invention to provide a digital phase-pulse demodulator that can demodulate a single tone, which is phase-pulse modulated simultaneously by one or plural independent channels of binary information.

2

It is another object of the present invention to provide a phase-pulse demodulator which can have no cross-talk chargeable to the detector between plural channels carried by a single tone.

It is still another object of this invention to provide a phase-pulse demodulator which requires only a single keyed-filter, regardless of the number of independent channels being carried by a single phase-pulsed tone.

It is a further object of this invention to provide a phase-pulse demodulator which does not require the use of a keyed filter as a phase-storage device.

It is a still further object of this invention to reduce the frequency-tolerance requirements of a keyed-filter component in a phase-pulse demodulator by a factor of about four over keyed filters used in prior phase demodulators, due to the elimination of their use as a phase-storage device. A keyed filter in the invention is used only as a phase-integration device.

It is another object of this invention to provide a phase-pulse demodulator that is stable and requires no adjustment after manufacture.

This invention requires a single keyed filter as a component. The keyed filter is gated synchronously with a received phase-pulsed tone. One means of obtaining synchronization of a phase-pulse receiver with a received phase-pulsed tone is described in Patent No. 2,914,674 titled "Phase-Pulse Receiver Synchronization Means." The keyed filter is driven by the constant phase portion of each phase-pulse period and is sampled and quenched during the transient part of the following phase-pulse period. A pulse-former receives the output of the keyed filter and generates one or more pulses-per-cycle which bear a predetermined timing with the axis-crossings of the filter's output wave.

A "one-pulse" sampling gate passes one pulse from the pulse former at the end of each phase-pulse in response to a sampling-timing pulse timed with the end of an integrated phase-pulse.

A phase-storage circuit is used and may be of the type described in patent application Serial No. 732,900 titled "Phase Storage Circuit," filed May 5, 1958 by the inventor of this application. A unique digital phase detector is provided in this invention by one or more binary frequency-dividers connected to the phase-storage circuit and by differentiating circuits connected to the outputs of the binary dividers. A single digital phase detector can detect any required number of channels modulated on a single phase-pulsed tone. When using phase-storage circuits of the type in application Serial No. 732,900 (cited above), the phase detector is obtained by connecting respective differentiating circuits to the last $n$-number of binary dividers in the chain of dividers provided by such phase-storage circuit for demodulating $n$-number of channels on a tone. The phase-detector output is in coded form where more than one channel-per-tone is received. Consequently, a decoding circuit is provided for segregating plural-channel-per-tone information into the respective outputs for the independent channels.

Further objects, features and advantages of this invention will become apparent to one skilled in the art upon further study of the specification and accompanying drawings in which:

FIGURE 1 diagrams modulated phase relationships for an input tone carrying a single channel of information;

FIGURE 2 illustrates an embodiment of the invention for demodulating a tone that is modulated according to FIGURE 1;

FIGURES 3(A) through (G) provide waveforms used in explaining the operation of the embodiment of FIGURE 2;

FIGURES 4(A) through (H) show waveforms used in explaining the phase-detection operation of the invention shown in FIGURE 1;

FIGURE 5 diagrams the modulated phase relationships for an input tone carrying two independent channels of information;

FIGURES 6(A) through (I) are waveforms used in explaining the invention;

FIGURE 8 illustrates waveforms used in explaining the plural channel per tone phase detection in the embodiment of FIGURE 7;

FIGURE 9 is still another embodiment of the invention;

FIGURE 10 is a further embodiment of the invention; and

FIGURE 11 shows waveforms used in explaining the embodiment shown in FIGURE 10.

Figure 3:
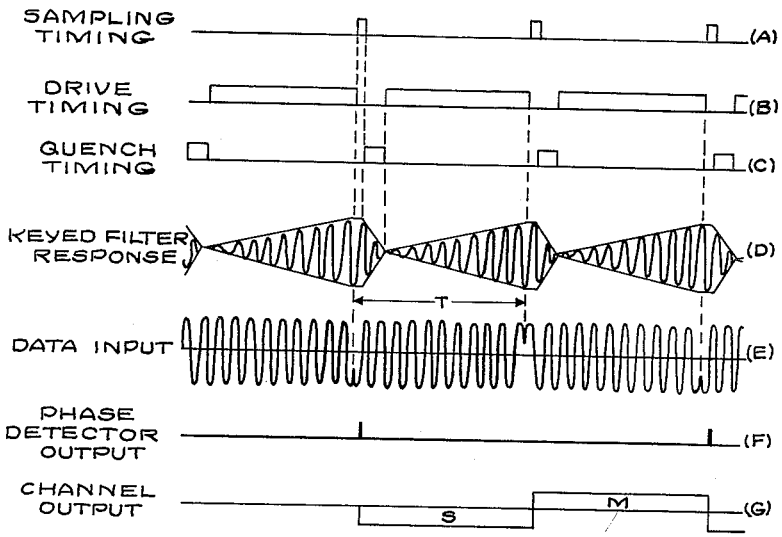

Now referring to the drawings for a more detailed description of the invention, FIGURE 1 illustrates modulated phase relationships between time-adjacent phase-pulses carrying a single channel of information on a tone. FIGURE 3(E) illustrates a tone that is phase-pulse modulated by the binary information shown in FIGURE 3(G). Each phase-pulse has a period T. Hence, the modulated information is contained in the phase-shift between adjacent phase-pulses. This phase-shift occurs as a transient introduction for each phase-pulse. After the short introductory transient portion, the phase during the remainder of the pulse-period T remains substantially constant. Thus, the phase of each pulse may be determined by its constant-phase portion. Then, the information embodied in each phase shift is recoverable by comparing the phases of the constant-phase portions of adjacent phase-pulses. Consequently, some means is required in the demodulation process for storing the phase of the prior phase-pulse in order to permit a phase comparison which will yield the modulated information. The stored phase is taken as the reference for each comparison.

In FIGURE 1, a 90° phase-shift between adjacent phase-pulses represents a mark (M), and a 270° phase-shift between adjacent phase-pulses represents a space (S). In each case, the zero-reference phase is the phase of the prior of any two compared phase-pulses, regardless of its absolute phase with respect to some arbitrary fixed phase standard.

FIGURE 2 illustrates an embodiment of the invention which demodulates a phase-pulsed tone that is modulated according to the coding given in FIGURE 1. Received phase-pulsed data is provided to a terminal 10, which is connected to a keyed filter 11. Such keyed filters are the subject of Patent No. 2,825,808 issued March 4, 1958 to Melvin L. Doelz and Earl T. Heald. A circuit for generating quench and drive timing for a keyed filter as shown in FIGURE 2 of Patent 2,914,674 or as described in Patent 2,905,812, both being assigned to the same assignee as the present application. Therefore, keyed filter 11 is only briefly explained herein. It comprises a stable high-Q resonator 12, a drive gate 13, and a quench gate 6. Drive gate 13 has one input connected to terminal 10, and another input is connected to another terminal 14 that receives an enabling signal timed with the constant-phase portions of the received phase-pulses. Hence, only the constant-phase portion of each phase-pulse is passed by gate 13 in an input of resonator 12. FIGURE 3(B) illustrates the enablement timing during which the constant-phase portions of the signal in FIGURE 3(E) are permitted to be received by resonator 12. Resonator 12 integrates each constant-phase portion in order to improve the signal-to-noise detection qualities of the phase of each phase-pulse. The integration occurs as an amplitude build-up, and the phase at the end of the build-up period is the average phase of the signal entering the resonator during that period. FIGURE 3(D) illustrates the amplitude build-up and damping cycle within resonator 12.

Quench gate 16 is connected between the output and input of resonator 12 and normally provides positive feed-back that elevates the Q of the resonator to a very high value, but below that which would cause oscillator operation. A source (not shown) of quench-timing pulses is connected to terminal 17; and during the interval of each quench pulse, gate 16 reverses phase to provide a large amount of negative feedback, which quickly damps to zero any build-up oscillation within resonator 12. FIGURE 3(C) illustrates quench pulses which precede the drive periods shown in FIGURE 3(B).

A pulse former 20 receives the output 18 from the resonator of keyed filter 11. Pulse former 20 generates a short-duty-cycle pulse whenever a resonator-output cycle makes an alternating-current axis-crossing in a positive-going manner. In FIGURE 3, one pulse-per-received-cycle is generated by pulse former 20; and these pulses are assumed to have positive polarity for the sake of illustration.

In general, the period T of a phase-pulse is long compared to a period of the tone frequency. For example, the tone frequency might be 3,000 cycles-per-second while the phase-pulse repetition rate may be 45 cycles-per-second. Thus, there may be dozens of axis-cross pulses generated by pulse former 20 during the period T of each phase-pulse. A one-pulse sampling gate 30 receives the axis-crossing pulses from pulse former 20 and only passes one of them each time it is enabled. The sampling gate is enabled only at the end of each phase-pulse period T because of the integrating operation of resonator 12; wherein a phase determined by the resonator is most reliable at the end of each integration period. Since the resonator phase is measurable by the timing of the periodic axis-crossing pulses from pulse former 20, the resonator's phase timing is determinable by passing one axis-crossing pulse at the end of each period T.

A sampling-timing source (not shown) is connected to a terminal 32, and it enables gate 30 at the end of each phase-pulse period T and just before resonator quenching. FIGURE 3(A) illustrates the timing of the sampling pulses. The leading edge of the quench pulses may be differentiated to develop the timing pulses.

In order to permit only a single axis-crossing pulse to be sampled at the end of each phase-pulse, sampling gate 30 includes a coincidence gate 36 having one input receiving the axis-crossing pulses from pulse former 20. A flip-flop 33 has an output connected to the other input of coincidence gate 36. One input of flip-flop 33 is connected to terminal 32 to receive the sampling-timing pulses, and the flip-flop is triggered by the leading edge of each sampling-timing pulse to enable gate 36. The first axis-crossing pulse occurring after the leading edge of a sampling-timing pulse passes through gate 36 (and thereby through gate 30) and triggers a delay circuit 34, which provides a triggering output that resets flip-flop 33 before the arrival of the next axis-crossing pulse. The resetting of flip-flop 33 disables gate 36 so that no later axis-crossing pulse can pass through sampling gate 30 until the next sampling-timing pulse is provided. Thus, it is seen that in response to a sampling-timing pulse, only one pulse from pulse former 20 is permitted to pass through gate 30, regardless of the total duration of a sampling-timing pulse.

The phases of the received phase-pulses are hence obtained on a sequential basis by the samples axis-crossing pulses. Means must be provided to store the phase of each phase-pulse for a time approximately equal to T until the phase of the next phase-pulse is determined, so that a phase comparison can be made. A phase storage and detector circuit 40 stores the phase of a phase-pulse for the required time and phase compares it with the next received phase-pulse.

The circuitry of the phase-storage system is taught in patent application No. 732,900, filed May 5, 1958 by Frank Secretan, titled "Digital Phase Storage Circuit." Thus, a detailed description of the phase-storage circuitry is not given herein. Briefly, however, it includes a crystal oscillator 42, a pulse former 43, and a plurality of binary dividers connected in tandem. The pulse former provides one pulse per oscillator cycle. The tandem-connected binary-divider circuits 51 and 56 may be flip-flops connected as dividers. The repetition rate of the last divider is equal to the tone frequency at input terminal 10. Thus, the frequency of crystal oscillator 42 is a multiple of the tone frequency determined by the total frequency division of the series-connected dividers.

Each divider 51—56 includes a reset input which is connected in common to the output 41 of sampling gate 30. For the sake of illustration, it is presumed herein that whenever a reset pulse is provided, all of the dividers are reset to their high voltage levels. A consequence of simultaneously resetting all of the dividers is to cause the output of the last divider 56 to begin a new cycle of output, regardless of its previous condition.

Phase detection is obtained in circuit 40 as a consequence of resetting the phase in the storage circuit. The phase detection occurs as a digital phenomenon related to the resetting operation of the last divider 56 of the chain. The phase detection is manifested by a pulse on no-pulse output from a differentiating circuit 63 connected to divider 56 at the time of reset. A pulse indicates the reception of a space (S); while no-pulse indicates a mark (M) in response to information modulated according to FIGURE 1.

A delay circuit 37 is connected serially to the output of detector circuit 40 in order to delay the output pulses by an amount which slightly exceeds the recovery time for a flip-flop 76, which is discussed below.

A decoding and shaping circuit 70 provides a binary output wave comprising spaces and marks as determined by the pulse and no-pulse output from detector 40. Circuit 70 comprises a flip-flop 76 which has one input 78 receiving the output of differentiating circuits 63 after it is delayed by circuit 37. A pulse received at this input triggers the output provided at terminal 81 to a low output state representing a space. Another input 79 is connected to the output of gate 30. Each sampled axis-crossing pulse resets flip-flop 76 to its high output state representing a mark. If no pulse is provided to input 78 (indicating a mark) the flip-flop output remains at its reset output level representing a mark. On the other hand, if a pulse is received at input 78, flip-flop 76 is triggered to its low output level to indicate a space. Delay circuit 37 avoids any possible coincidence between the resetting pulse at input 79 and a data pulse at input 78. Thus, the delay by circuit 37 permits flip-flop 76 to recover from any transient state caused by a reset pulse at input 79 before triggering can be done at input 78.

Figure 4:
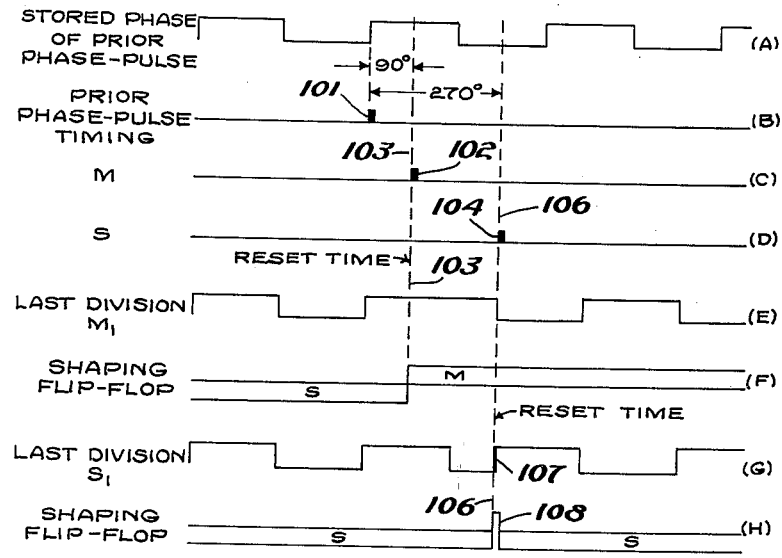

The demodulation operation of phase detector 40 is more readily understood by reference to FIGURES 4(A) through (H). FIGURE 4(A) represents the reference phase of a prior phase-pulse. FIGURE 4(B) shows the timing of a sampled axis-crossing pulse which obtained the phase in FIGURE 4(A). The phase position of pulse 101 is accurate within a single period of the wave in FIGURE 4(A); nevertheless, prior pulse 101 occurred an integral number of periods previously at the end of a prior phase-pulse. Hence, the phase of pulse 101 is stored in the periodic position of the cycles of the wave in FIGURE 4(A).

A following phase-pulse carrying mark (M) information provides the relative timing illustrated in FIGURE 4(C) by an axis-crossing pulse 102, which is the sampled output from gate 30. Pulse 102 occurs at a time 103 which is 90° (and an integral number of 360°) behind pulse 101. The integral number of 360° can be neglected without information error.

FIGURE 4(E) represents the output of last divider 56 prior to and after reset of the phase-storage circuit by axis-crossing pulse 102. The portion of the wave in FIGURE 4(E) prior to reset time 103 has the phase of the prior phase-pulse. At time 103, the output phase of the phase storage circuit is reset to begin a new cycle, which begins the stored phase of the new phase-pulse. That is, a reset pulse triggers all of the dividers to their high-level states which begins a new positive-going storage cycle.

However, at time 103, last divider 56 was already in its high level state and therefore was not triggered, although prior dividers were necessarily reset in order to begin a new cycle. Thus, no pulse is provided from differentiating circuit 63 at time 103. Hence, the output from the phase detector at reset time is no-pulse, which indicates a mark (M).

However, as shown in FIGURE 4(F), the output 81 of flip-flop 76 was reset to its high level by the reset pulse at time 103. Since no pulse was received from the phase detector, flip-flop 76 is not triggered, and it remains at high level to indicate a mark (M).

On the other hand, if instead of pulse 102 the following phase-pulse represents a space (S), it provides an axis-crossing pulse 104, as illustrated in FIGURE 4(D), which occurs at a time 106 that is 270° (and an integral number of 360°) behind reference pulse 101.

Pulse 104 occurs during the low-output state of last divider 56. Accordingly, the reset pulse triggers last divider 56 to its high level to cause the transient indicated by leading edge 107 in FIGURE 4(G). Leading edge 107 generates a pulse from differentiating circuit 63 at reset time 106 to provide the phase detector output representing a space (S).

Shaping flip-flop 76 is also reset at time 106 to a high output lever, as shown in FIGURE 4(H). However, the delayed phase-detector pulse from delay circuit 37 occurs shortly thereafter at time 108 to very quickly retrigger the output of flip-flop 76 to its low-level condition representing a space (S). The short pulse preceding output space bits will cause a slight amount of output jitter at terminal 81. However, in many cases, it will not be objectionable. Furthermore, it can be reduced greatly by providing a low-pass filter (not shown) at terminal 81, since the frequency components of such pulses as 108 will be very high and would be greatly attenuated by a high-pass filter; while the low-repetition pulses representing the information output at terminal 81 would pass through such filter with only a slight rounding of their leading and trailing edges.

FIGURE 3(F) illustrates phase-detector output pulses and FIGURE 3(G) illustrates the corresponding output from terminal 81.

Figure 5:
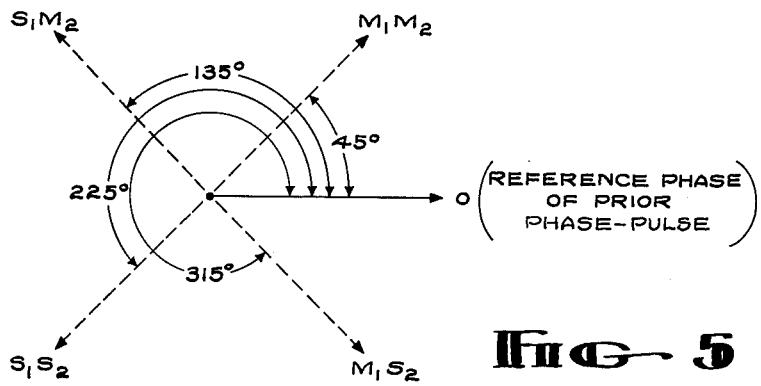

A single tone that is phase-pulse modulated can be made to carry more than one independent channel of information. That is, a single phase-pulse modulated tone can simultaneously carry two or more independent channels of binary information. FIGURE 5 illustrates a phase-pulse coding system for encoding two independent channels on a single tone. This requires a choice of four phases for each phase-pulse relative to its preceding phase pulse. The four phases illustrated in FIGURE 5 are relative to reference phase (O), which represents the phase of the preceding phase-pulse. In FIGURE 5, $M_1$ and $S_1$ represent a mark and space of a first channel; and $M_2$ and $S_2$ represent a mark and space of a second channel. In the code given in FIGURE 5, a 45° phase comparison yields combined information $M_1M_2$. Similarly a 135° phase comparison yields $S_1M_2$, a 225° phase comparison yields $S_1S_2$, and a 315° phase comparison yields $M_1S_2$. It is at once noted that type of coding is arbitrary in relating the information combinations to the phases.

Figure 6:
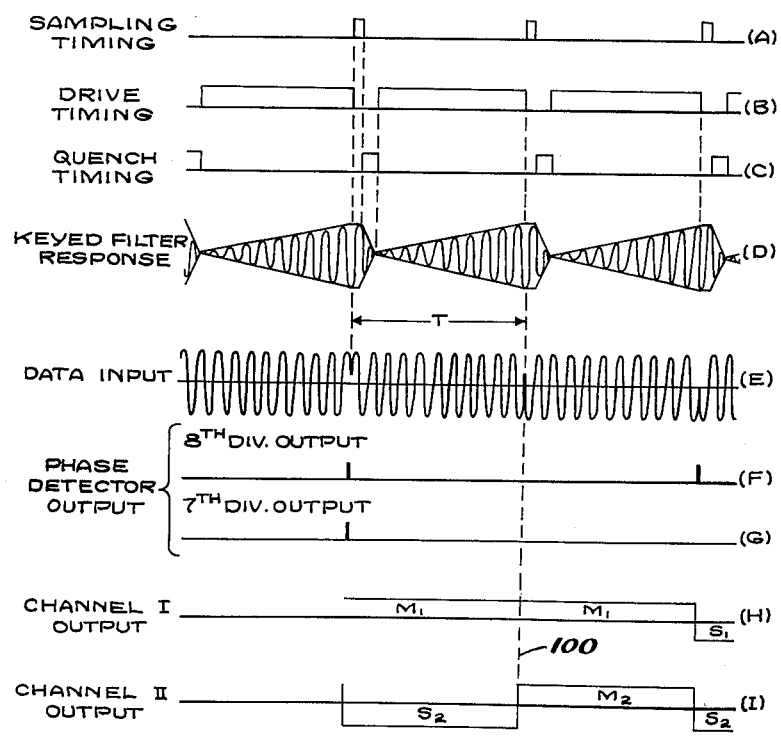
Figure 7:
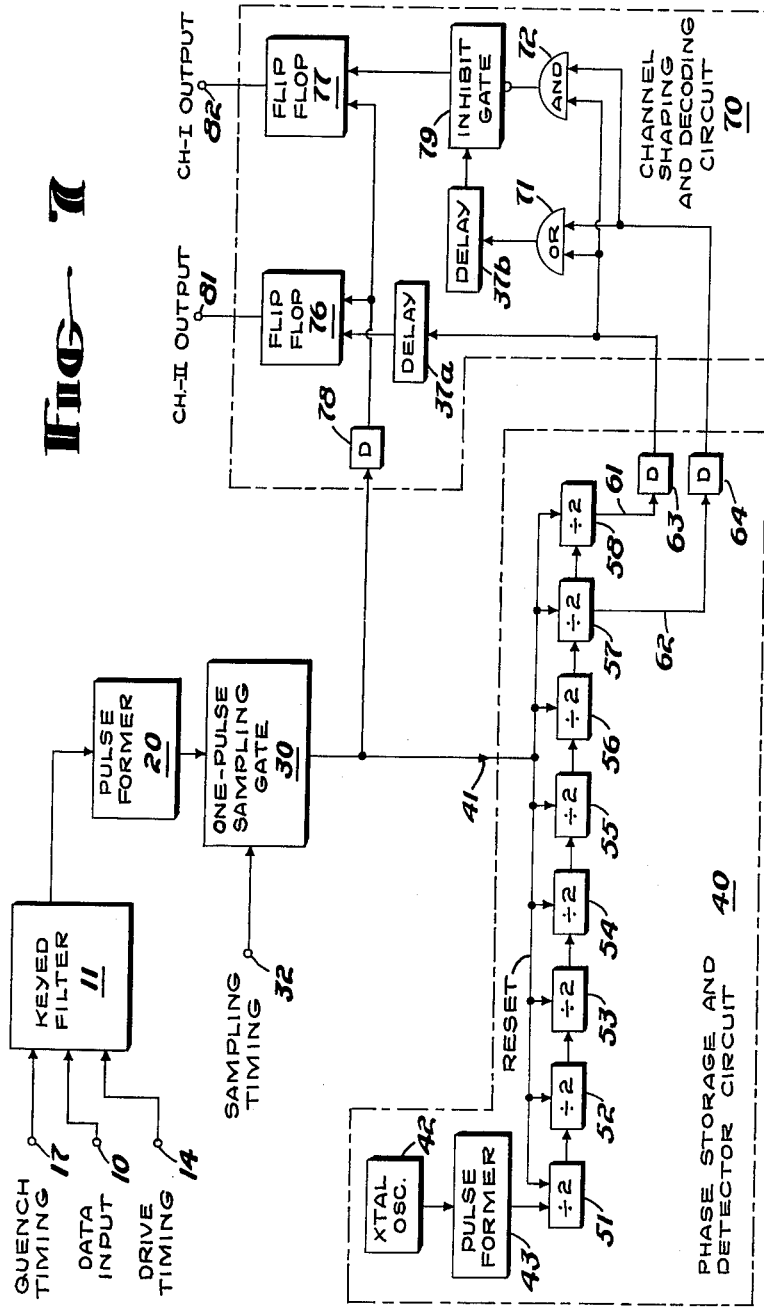
FIGURE 7 is another embodiment of the invention.

The invention shown in FIGURE 7 provides a means for detecting two independent channels simultaneously encoded on a single tone in accordance with FIGURE 5. The parts of the FIGURE 7 that can be identical with FIGURE 2 include keyed filter 11, pulse former 20, and one-pulse sampling gate 30. Phase storage and detector circuit 40 in FIGURE 7 is also similar to that in FIGURE 2, but the last two dividers are used in FIGURE 7 to phase-detect two channels of information. The fact that eight dividers are shown in FIGURE 7 rather than the six dividers in FIGURE 6 is arbitrary to the extent that a minimum number of dividers must be provided to obtain a required storage accuracy, as explained in the above-cited application Serial No. 732,900.

In FIGURE 7, two opposite-phased outputs are provided from each divider 57 and 58. They are output 61 from last divider 58 and output 62 from penultimate divider 57. Although the information is entirely contained in one output of each divider 57 and 58, the opposite-phased outputs assist the operation of decoding circuitry that follows.

Differentiating circuits 63 and 64 connect to the outputs of dividers 57 and 58 and provide the phase-detected signals.

The phase-detector operation in FIGURE 7 is basically similar to that in FIGURE 2 and may be explained with the assistance of the waveforms shown in FIGURE 8. FIGURES 8(A) and (B) represent the reference phase of a prior phase-pulse. The outputs of two dividers are used because they provide 90° of phase resolution which is required in the coding system of FIGURE 5. On the other hand, the single channel coding system of FIGURE 1, only 180° of phase resolution was necessary and only the last output of the last divider was needed to obtain it. If three channels were encoded, 45° of phase resolution would be needed, and the outputs of the last three dividers would be required. It is therefore apparent how the logic of this invention can be extended to decode any number of channels carried on a single tone by using the outputs of a like number of dividers starting with the last divider. Since the phase resolution decreases as the number of channels per tone is increased, a practical limit is reached when a phase resolution is obtained which cannot be made smaller.

FIGURE 8(C) illustrates the timing of the axis-crossing pulse 101 provided from sampling gate 30 by the prior phase-pulse. Both waves in FIGURES 8(A) and (B) move to their high-voltage states to begin a positive-going cycle in phase with pulse 101 (less some multiple of 360° which does not cause any ambiguity herein due to the phase storage).

FIGURE 8(D) illustrates the timing of a sampled axis-crossing pulse from an $M_1M_2$ phase-pulse relative to the phase-timing of prior reference pulse 101. Thus, the divider chain is reset to begin a new positive-going cycle at time 103 of pulse 102. Since the outputs of dividers 57 and 58 were at high-voltage levels at time 103, their output states were not altered by the resetting pulse 102. Hence, no transient occurred at time 103, and no outputs were provided from differentiating circuits 63 or 64. The $M_1M_2$ response at the outputs of dividers 57 and 58 is illustrated in FIGURES 8(H) and (I).

An $S_1M_2$ phase-pulse provides a sampled axis-crossing pulse 104 at time 105 in FIGURE 8(E) relative to the phase-timing of reference pulse 101. Pulse 104 occurs 135° behind pulse 101 (neglecting integral multiples of 360°). The effect of pulse 104 upon the outputs of dividers 57 and 58 is illustrated in FIGURES 8(J) and (K) at time 105. It is noted that only the penultimate divider 57 is triggered by an $S_1M_2$ phase pulse. The transient effect is observed in FIGURE 8(K) by leading edge 106 occurring at time 105, which provides an output pulse from differentiating circuit 64.

In a like manner, an $S_1S_2$ pulse is represented by the timing-phase of a pulse 108 in FIGURE 8(F) occurring at time 109 that is 225° behind pulse 101 (neglecting multiples of 360°). This causes a transition in the outputs of divider 58, as seen in FIGURE 8(L) by leading edge 110 at time 109; and a corresponding pulse is provided from differentiating circuit 63. No transition occurs at this time from divider 57 as seen in FIGURE 8(M), and no pulse is provided from differentiating circuit 64.

An $M_1S_2$ phase-pulse is represented by a pulse 110 occurring at time 111 in FIGURE 8(G) relative to reference pulse 101. Pulse 110 lags by 315° (and an integral number of 360°). Both the waves in FIGURES 8(A) and (B) having the reference phase are in negative states at time 111. Accordingly, the outputs of both dividers 57 and 58 are triggered at time 111, as illustrated in FIGURES 8(N) and (O) to provide leading edges 113 and 114. Consequently, differentiating circuits 63 and 64 provide output pulses.

The phase detector output coding for two channels per tone is summarized in the following table:

| Phase-Pulse | Phase-Detector Output | |
|---|---|---|
| | Div. 57 | Div. 58 |
| $M_1M_2$ | 0 | 0 |
| $S_1M_2$ | 1 | 0 |
| $S_1S_2$ | 0 | 1 |
| $M_1S_2$ | 1 | 1 |

In the above table, 0 and 1 indicate no-pulse and a pulse, respectively.

The phase detected information still must be decoded into its separate channel components. This is done in a shaping and decoding circuit 70, which receives the coded information and translates it into a form useable by teletypewriter machines, for example.

Decoding circuit 70 includes a pair of flip-flop circuits 76 and 77. They each have a resetting input connected through a differentiating circuit 78 to the output of sampling gate 30. As a result, each reset pulse triggers the output of flip-flop 76 to its high-level mark (M) state, as was done in FIGURE 2. However, the same reset pulse is delayed by circuits 37a and 37b before it can trigger the storage circuit. Accordingly, flip-flops 76 and 77 can recover from being reset before they are triggerable by any phase-detector output pulses. This will cause a slight amount of jitter in the outputs of FIGURE 7 as it did in the output of FIGURE 2, but the jitter is not objectionable in many situations. Improvements later described with the circuit of FIGURE 9 indicate how this jitter problem can be eliminated.

The second channel output, comprising marks ($M_2$) and spaces ($S_2$), is directly obtainable from the output of last divider 58, and this is apparent from the above table. Hence, flip-flop 76 has an information-triggering input connected to the output of differentiating circuit 63, and is directly controlled by last divider 58.

The decoding for the first channel is not as simple as for the second channel. For this purpose, gates 71, 72 and 79 are provided. From the above table, it is seen that $S_1$ information is obtained whenever only one pulse is provided from dividers 57 and 58, and $M_1$ information is provided when no-pulses or two pulses are provided from the dividers. A pair of inputs of "or" gate 71 are connected to both differentiating circuits 63 and 64; while the inputs to "and" gate 72 are connected likewise. Thus, "or"

gate 71 passes a pulse from either differentiating circuit, while "and" gate 72 indicates when simultaneous pulses are provided which should be blocked. Delay circuit 37b and inhibit gate 79 are connected serially between the output of "or" gate 71 and the information input to flip-flop 77. The inhibit gate is normally enabled and only inhibits the "or" gate output when pulses are provided from both circuits 63 and 64. Delay circuit 37b has a second function in addition to preventing coincidence between the resetting and the information triggering of flip-flop 77. The second function is to allow the inhibiting gate to act before the "or" gate output can pass through it.

FIGURES 6(A)–(I) illustrate the over-all operation of the two-channel per tone embodiments, such as shown in FIGURE 7, and will be discussed later with FIGURES 9 and 10. FIGURE 6(E) represents a sequence of phase-pulses carrying two channels on a single tone. FIGURES 6(A)–(D) indicate the corresponding operating and timing of keyed filter 11. FIGURES 6(G) and (F) illustrate the corresponding phase-detector outputs when the input wave in FIGURE 6(E) carries phase-pulses $M_1S_2$, $M_1M_2$, and $S_1S_2$. FIGURES 6(H) and (I) show the decoded and shaped binary information provided at the respective channel outputs 81 and 82. Note that at time 100, no pulses were provided from the phase detector, which indicated $M_1M_2$ information.

The circuit illustrated in FIGURE 9 shows how jitter may be eliminated at output terminals 81 and 82.

In FIGURE 9 an information-storage circuit 90 is connected between the phase-detector outputs and the inputs to decoding and shaping circuit 70. In FIGURE 9, the outputs from differentiating circuits 63 and 64 provide inputs 66 and 67 to circuit 90 as given in the above table.

Circuit 90 comprises a pair of "and" gates 91 and 92, which have outputs connected to a pair of storage flip-flop circuits 93 and 94. The "and" circuits each have an input connected respectively to differentiating circuits 63 and 64. They also have an enabling input connected to the output of flip-flop 33 in sampling gate 30. Thus, the output from the differentiating circuits 63 and 64 is permitted to pass through "and" gates 91 and 92 only during the sampling period for gate 30. Since the enablement of flip-flop 33 terminates very shortly after a sampled pulse is passed by gate 30, the last pulse that is permitted to pass through either "and" gate 91 or 92 during its enablement period will be an information pulse. Thus, the final triggering of flip-flops 93 and 94 will be in response to phase-detector information pulses and will not be due to a pulse generated by a periodic switching transient of either divider.

Flip-flops 93 and 94 are reset to outputs representing $M_1$ and $M_2$ respectively by means of the leading edge of each sampling timing pulse. Thus, a reset input 97 of circuit 90 connects terminal 32 to the mark-reset input of each flip-flop 93 and 94 through a differentiating circuit 96, that generates a reset pulse from the leading edge of each sampling-timing pulse.

A pair of phase inverted outputs is provided from each storage flip-flop 93 and 94.

The channel decoding and shaping circuit 70 in FIGURE 9 includes means for sampling the outputs of the storage circuits after any jitter in them has terminated. This sampling is timed with the leading edge of the drive-timing pulses, which are seen in FIGURE 6 to being shortly after the termination of a sampling-timing pulse. Sampling-timing is provided from the output of differentiating circuit 88, which is connected to terminal 14. Six "and" circuits 71, 72 and 83 through 86 are provided in circuit 70, and each has an enabling input connected to the output of differentiating circuit 88. "And" circuits 71, 72, 83 and 84 each have an additional pair of inputs, which are connected to the inverted outputs of storage circuits 93 and 94 in permuted combinations. Basically, "and" circuit 71 is connected to non-inverted outputs of storage flip-flops 93 and 94, while "and" circuit 72 is connected to inverted outputs. The outputs of "and" circuits 71 and 72 provide a pulse when a channel-I mark ($M_1$) is obtained because coincidence of inputs is then obtained.

"And" circuits 83 and 84 are connected to an inverted output and a non-inverted output of different flip-flops. "And" circuit 83 or 84 provides a pulse when a channel-I space ($S_1$) is obtained.

An "or" circuit 89 connects the $M_1$ outputs of "and" gates 71 and 72 to one input of flip-flop 77 that can trigger it only to its low output level ($M_1$). On the other hand, another "or" circuit 87 connects the $S_1$ outputs of gates 83 and 84 to another input of flip-flop 77 that can trigger it only to the high output level ($S_1$).

Accordingly, flip-flop 77 is triggered according to the channel-I information and provides it accordingly at terminal 82.

"And" circuits 85 and 86 provide mark and space outputs which correspondingly trigger flip-flop 76 to provide the channel-II output in basically the same manner as was done in FIGURE 7.

The outputs at terminals 81 and 82 in FIGURE 9 are thus timed with the leading edges of the drive-timing pulses, which can be free of jitter.

FIGURE 10 provides an improvement over the prior embodiments which permits the sampling-timing pulses, shown in FIGURE 6(B), to have only about one-half the duration required in the previously described embodiments of FIGURES 2, 7 and 9. In the prior embodiments, it was necessary that each sampling pulse be at least as long as one period of the tone frequency to insure that one pulse could be sampled by gate 30. However, the duration of the sampling-timing pulses is at the expense of the quench-timing pulses. In other words, if the sampling time can be shortened, the quenching time can be correspondingly lengthened to insure better quenching of the resonators. Furthermore, if sufficient quenching already exists, the drive-timing pulses can instead be correspondingly lengthened. Thus, the system shown in FIGURE 10 can improve either the quenching or the integration operation of keyed filter 11.

In FIGURE 10, pulse-forming circuit 20 generates axis-crossing pulses at twice the repetition rate of previous embodiments. This is done by using both the positive-going and negative-going axis-crossings of each tone cycle to generate pulses. Hence, there are provided two pulses per tone cycle at input 31 of sampling gate 30 in FIGURE 10.

Many ways are known in the art for generating pulses at both axis-crossings in a cycle. In FIGURE 10, an amplitude limiter 21 in circuit 20 receives the tone-frequency output from keyed filter 11. A differentiating circuit 22 is connected to the output of the limiter and differentiates the received square wave to provide a positive pulse at the positive-going axis-crossing and to provide a negative pulse at the negative-going crossing. The positive and negative pulses are segregated in well-known types of separators 23 and 24, which comprise oppositely-polarized diodes serially-connected between load resistors and the output of differentiating circuit 22. A pulse adder 26 is provided which has a transformer containing a primary with a grounded center-tap. The outputs of separators 23 and 24 are connected to opposite ends of the primary. A secondary of the transformer provides the added pulses with positive polarity at twice the repetition rate of the pulses from either separator. Although all pulses from adder 26 have positive polarity, those pulses provided by negative-pulse separator 24 will hereafter be referred to as negatively-timed pulses to distinguish them from the pulses provided by separator 23, which will be referred to as positively-timed pulses.

Sampling gate 30 in FIGURE 10 is constructed in the same manner as gate 30 in FIGURE 9.

Phase storage and detector circuit 40 in FIGURE 10 is similar to circuit 40 in FIGURE 9, except that in FIG- URE 10 last divider 58 is provided with an additional reset input 48, which permits resetting of divider 58 to the opposite output state from its other resetting input. The divider resetting inputs connected to output 41 of gate 30 permit triggering of the dividers to their higher-output states. Thus, resetting input 48 allows divider 58 to be triggered to its lower-output state.

A correction in the phase-detector output is obtained by the opposite triggering input 48. Unless corrected, an error would occur in the phase-detector output when circuit 40 is triggered by a negatively-timed pulse, due to the fact that the negatively-timed pulses are displaced by 180° from the positively-timed pulses at the tone frequency. A reset correction gate 46 prevents such error from occurring. Correction gate 46 has an input 45 connected to the output of negative-pulse separator 24 and has an output connected to resetting input 48 of the last divider. An enabling input 47 of gate 46 is connected to the output of flip-flop 33 in sampling gate 30, which is constructed in the same manner as shown in FIGURE 9. The timed operation of flip-flop 33 likewise permits only one axis-crossing pulse to pass through correction gate 46. That is, if a negatively-timed pulse passes through gate 30, a corresponding pulse passes through gate 46. However, no pulse passes through gate 46 if a positively-timed pulse passes through gate 30, because no negatively-timed pulse occurs during such timed operation of flip-flop 33. Whenever negatively-timed pulses are simultaneously applied to both resetting inputs of divider 58, the pulse at input 48 controls and the last divider is triggered (or maintained) at its low output level.

Differentiating circuits 63 and 64 provide the phase-detector output of circuit 40 in FIGURE 10 in a manner similar to FIGURE 9. A difference of no theoretical consequence is that in the system of FIGURE 10 differentiating circuit 63 provides output pulses of arbitrary polarity rather than pulses of a single polarity which occurred from differentiating circuit 64 in FIGURE 9. However, the coding given in the above table is still applicable in FIGURE 10. Accordingly, the information from circuit 40 is encoded on a pulse or no-pulse basis, regardless of the polarity of the pulses.

Information storage circuit 90 in FIGURE 10 may be the same as given in FIGURE 9. However, due to the use of pulses of either polarity from differentiating circuit 63, it is necessary to design storage flip-flop 93 to be triggered to its lower level by input pulses having either polarity. Bipolarity triggering is well known in the art.

Channel decoding and shaping circuit 70 in FIGURE 10 may be constructed in the same manner as circuit 70 in FIGURE 9.

When the circuit in FIGURE 10 is triggered by positively-time pulses, the waveforms of FIGURES 8(A)–(O) still apply. However, FIGURES 11(A)–(O) are provided in order to enable a better understanding of the operation of the circuit in FIGURE 10 when it is triggered by negatively-time pulses.

FIGURES 11(A) and (B) are respective outputs of dividers 58 and 57 and represent the reference phase of a prior phase-pulse. FIGURE 11(C) represents a sampled axis-crossing pulse 129 that is timed with the reference phase (within a range of 360° of the tone wave). FIGURES 11(D)–(G) each illustrate the timing of both a negatively-timed pulse (blackened) and a positively-timed pulse (dashed) relative to the reference phase for the four comparative phases carrying dual-channel information. It is presumed in FIGURE 11 that only the negatively-timed pulses (blackened) are sampled by gate 30, since the reader can refer to FIGURE 8 for operational information when gate 30 selects a positively-timed pulse. A negatively-timed pulse is always 180° of phase further behind the reference phase than a positively-timed pulse.

In FIGURE 8(D), a negatively-timed pulse 122 represents and $M_1M_2$ phase-pulse; and it occurs at a time 123, which is 225° behind the reference pulse 120. Dividers 58 and 57 respectively have the output waves shown in FIGURES 11(H) and (I) in response to reference pulse 120 and then resetting pulse 122. It is noted in FIGURE 11(H) that the last-divider output is at its low level at time 123. However, the negatively-timed pulse 122 applied through correction gate 46 to resetting input 48 maintains divider 58 in its low state by overpowering the effect at its other resetting input. Penultimate divider 57 also retains its high voltage output, since all of the other dividers except 58 are always switched to (or maintained at) their high output levels. Consequently, there is no change of state by either divider 57 or 58 in response to a negatively-timed pulse representing $M_1M_2$ information. Hence, there are no pulses provided at the output of differentiating circuits 63 and 64 in FIGURE 10, which corresponds to the coding given for $M_1M_2$ information in the above table.

FIGURES 11(J) and (K) illustrate the respective divider outputs in response to negative pulse 126 representing $S_1M_2$ information. Pulse 126 occurs at time 127. Again, correction gate 46 causes retention of the low voltage output state of last divider 58. However, divider 57 is switched. Accordingly, it is seen that there is no pulse from differentiating circuit 63; but there is a pulse from differentiating circuit 64. This corresponds to the coding in the above table for $S_1M_2$ information.

It is further noted that the coding in the above table is also obtained for $S_1S_2$ information in FIGURES 11(L) and (M) by a negatively-timed pulse 128 shown in FIGURE 11(F).

Likewise, FIGURES 11(N) and (O) illustrate the response of dividers 58 and 57 to a negatively-timed pulse 131 given in FIGURE 11(G), representing $M_1S_2$ information. Here, both dividers are switched at time 132 to provide pulses from both differentiating circuits 63 and 64. In the two cases of negatively-timed pulses having $S_1S_2$ and $M_1S_2$ information, divider 58 was in a high state but was triggered through correction gate 46 to its low state. This provided the required phase-detector output pulses, although with opposite polarity for the pulses of differentiating circuit 63. As stated above, this opposite polarity need cause no difficulty, since a flip-flop circuit can be made to be triggered in a particular manner by pulses of both polarities.

While phase-pulse detectors have been described in detail herein for demodulating either one or two channels of independent information carried on a single tone, the rationalization for the described system can be applied for demodulating any finite number of channels modulated on a single tone. When N-number of channels are provided, the outputs of the last N-number of dividers in phase storage and phase detector circuit will contain the information of all N channels in binary-encoded form. The code will be in binary digit form with the last divider providing the digit with the greatest weight, and the Nth divider providing the digit with the lowest weight, in that order. The above table gives a two-digit system. Furthermore for N number of channels, the phase resolution in the encoding process is $$\frac{360}{2^n}$$

because there will be $2^n$ separate phases required for N channels per tone. Preferably, the reference phase is spaced by half the resolution amount of the nearest encoding phase, in order to center the reset pulses within the operation cycles of the Nth divider. For example, with three channels encoded on a single tone, there will be nine phases between adjacent phase-pulses which are separated by 60° intervals instead of 90° intervals in the case of two channels; and the first phase is 30° from the reference phase. Then, the outputs of the last three dividers 58, 57 and 56 will provide the detected information for all three channels in the form of binary numbers. A separate one of nine numbers will represent one of the nine received phases. A decoding circuit of the type shown but extended to three channels will then be required. The rationale of the invention is thus extended by logical extrapolation.

Although this invention has been described with respect to particular embodiments thereof, it is not to be so limited as changes and modifications may be made therein which are within the full intended scope of the invention as defined by the appended claims.

I claim:

1. A demodulator for a phase-pulsed signal comprising, means for generating pulses having a fixed phase-relationship with said signal, means for sampling one of said pulses per phase-pulse of said signal, phase-storage means connected to said sampling means, said phase-storage means providing an output frequency equal to a frequency of said signal, the phase of said phase-storage means being reset in response to the output of said sampling means, said storage means including at least N number of binary frequency dividers, N number of differentiating circuits connected to outputs of said dividers to detect the signal, and decoding and shaping means being connected to the output of said phase-storage means.

2. A demodulator for a received phase-pulsed signal carrying at least one channel of information comprising, means for forming at least one pulse per cycle of said received signal with a predetermined phase relationship, means for sampling one of said pulses per phase-pulse of said signal, a phase storage and detector circuit including a plurality of frequency dividers, and an oscillator connected to said dividers for driving them in tandem, an output frequency of one of said dividers being equal to the frequency of said received signal, a differentiating circuit connected to said one divider to obtain detection of said one channel, a reset input of said phase-storage an detector circuit being connected to said sampling means for resetting said cricuit, and a pulsed output of said differentiating circuit at the instant of reset containing demodulated information of said signal.

3. A demodulator for a received phase-pulsed tone, means for forming at least one pulse per cycle of said tone in locked phase relationship, sampling-gate means for passing one of said pulses per received phase-pulse of said tone; a phase storage and detector circuit including a plurality of binary dividers, an oscillator driving said dividers in tandem, said dividers each having a reset input connected in common to said gate sampling means, and a differentiating circuit connected to at least one of said dividers; and an output of said differentiating circuit providing at least a component of detected digital information of said phase-pulsed tone at the instances of said sampling pulses.

4. A demodulator for a received phase-pulsed tone, encoded with a plurality of independent channels of information, comprising a pulse former providing an axis-crossing pulse per cycle of said tone, one-pulse sampling gate-means connected to said pulse former to pass one axis-crossing pulse-per-received phase-pulse, a phase-storage circuit having a phase-resetting input connected to said gate means; said storage circuit including an oscillator, a plurality of binary frequency dividers connected in tandem with said oscillator, a reset input of each of said frequency dividers being connected to the phase-re-setting input of said storage circuit, and the output frequency of a last of said dividers being equal to the frequency of said received tone; a plurality of differentiating circuits respectively connected to respective outputs of said frequency dividers, the outputs of said differentiating circuits at each instant of sampling providing demodulated information for all of said channels in binary digit form.

5. A demodulator as defined in claim 4 having a decoding and shaping circuit, comprising a plurality of bistable circuits, means for resetting said flip-flop circuits at or immediately prior to the instants of sampling, matrix-decoding, means for decoding the demodulated information into separate binary channels, means connecting said matrix-decoding means to outputs of said differentiating circuits, triggering inputs of said flip-flops connected to outputs of said matrix-decoding circuit, and said flip-flops respectively providing the binary information of the independent channels carried by said received tone.

6. A demodulator for a received phase-pulsed tone comprising, means for integrating each phase-pulse of said received tone, a pulse-forming means connected to the output of said intergrating means to generate at least one-pulse-per-positive-going axis-crossing of said tone, a one-pulse sampling gate connected to said pulse-forming means to receive said axis-crossing pulses, a sampling-timing source providing pulses timed with the ends of the integrations by said integrating means, said sampling-timing source connected to said one-pulse sampling gate to enable it to pass one axis-crossing pulse per timing pulse; a phase storage and detector circuit, including an oscillator, a plurality of frequency dividers connected in tandem to said oscillator, the output of one of said dividers having a repetition rate equal to the frequency of said tone, and at least one differentiating circuit connected to said one frequency divider to provide the output of said circuit; each of said frequency dividers having a resetting input connected to the output of said one-pulse sampling gate, a flip-flop circuit for providing a shaped-demodulated output, means for resetting said flip-flop circuit to a given output state in response to pulses from said sampling-timing source, and means connecting a triggering input of said flip-flop to an output of said differentiating circuit.

7. A demodulator for a received phase-pulsed signal as defined in claim 6 in which a keyed filter comprises said integrating means, and said sampling gate includes a coincidence gate having an input connected to said pulse former and an output connected to the resetting inputs of said frequency dividers, a flip-flop having an output connected to another input of said coincidence gate, one input of said flip-flop connected to said sampling-timing source, and a delay circuit connected between the output of said coincidence gate and another input of said flip-flop, with the delay of said delay circuit being short compared to a period of said tone frequency.

8. A demodulator as defined in claim 6 including a delay circuit connected between the output of said differentiating circuit and an input of said flip-flop.

9. A demodulator as defined in claim 6 in which a delay circuit is connected between a resetting input of said flip-flop and the output of said one-pulse sampling gate.

10. A demodulator for a received phase-pulsed tone comprising, integrating means for respective phase-pulses of said received tone, a pulse-forming means connected to the output of said integrating means to generate at least one-pulse-per-cycle of said tone in fixed phase relationship with said tone, a one-pulse sampling gate connected to said pulse-forming means to receive said formed pulses, a sampling-timing source providing pulses timed with ends of the phase-pulses, said sampling-timing source connected to said sampling gate to enable it to pass one pulse from said pulse-forming means at the end of each phase-pulse; a phase storage and detector circuit, including an oscillator and a plurality of binary frequency dividers connected in tandem with said oscillator, the output of one of said dividers having a frequency equal to frequency of said received tone, and at least one differentiating circuit connected to said one frequency divider to provide a detected output, each of said frequency dividers having an over-riding reset input connected to the output of said sampling gate, a storage flip-flop, means connecting said storage flip-flop to said differentiating circuit to trigger it to an output state representing the detected output, and means for periodically sampling the output state of said storage flip-flop to provide a periodic demodulated signal.

11. A demodulator as defined in claim 10 wherein said connection means comprises an "and" gate with an input connected to said differentiating circuit, an output of said "and" gate connected to said storage flip-flop, and another input of said "and" gate connected to said sampling gate for enablement by said sampling timing source, said storage flip-flop having a resetting input connected to said sampling-timing source; said periodic sampling means comprising a shaping flip-flop providing the output of said demodulator and having a pair of resetting inputs, a periodic drive-timing source connected to one resetting input of said shaping flip-flop, and means connecting the other resetting input of said shaping flip-flop to an output of said storage flip-flop.

12. A demodulator for a received tone modulated with phase-pulses simultaneously encoding a plurality of independent information channels comprising keyed-filter means for respectively integrating phase-pulses of said received tone, timing means synchronized with said phase-pulses and connected to said keyed filter, pulse-forming means connected to an output of said keyed filter for generating at least one-pulse-per-cycle timed with an axis-crossing, a one-pulse sampling gate connected to said pulse-forming means to pass one of said generated pulses at the end of each integration, a sampling-timing means providing timing pulses occurring at the ends of integrations by said keyed-filter means, said sampling timing means connected to said sampling gate to enable it with said timing pulses to pass one of said formed pulses at the end of each phase-pulse; a phase storage and detector circuit, including an oscillator, a plurality of frequency dividers connected in tandem to said oscillator, one of said dividers having an output repetition rate equal to the frequency of the received tone, each divider having a resetting input capable of resetting it to a particular state, said resetting input connected to an output of said one-pulse sampling gate and at least a pair of differentiating circuits respectively connected to outputs of said one divider and an adjacent prior one of said dividers, with information pulses being provided from said differentiating circuits in time coincidence with outputs of said sampling gate, a pair of shaping flip-flop circuits, means connecting an output of said sampling gate to a resetting input of each of said storage flip-flops, and matrix means connected between triggering inputs of said storage flip-flops and said differentiating circuits to decode the detected information, and outputs of said flip-flops respectively providing segregated channel information.

13. A demodulator as defined in claim 12, in which said matrix means comprises a first delay circuit connected between a resetting input of one of said flip-flops and an output of the differentiating circuit connected to said one divider, an "or" circuit having a pair of inputs respectively connected to outputs of said differentiating circuits, an "and" circuit having a pair of inputs connected to the outputs of said differentiating circuits, a second delay circuit connected to an output of said "or" circuit, an inhibiting gate having an input connected to an output of said second delay circuit, and an output of the second delay circuit being connected to an input of said other flip-flop, and an output of said "and" circuit connected to an inhibiting input of said inhibiting gate.

14. A demodulator for a received tone modulated with phase-pulses simultaneously encoding N number of independent information channels, comprising keyed-filtering means for sequentially integrating the received phase-pulses, pulse-forming means for forming first and second polarity pulses at positive-going and negative-going axis-crossings of an output wave from said keyed-filtering means, means for inverting the second polarity pulses and providing all pulses with a common polarity, a one-pulse sampling gate connected to said pulse-forming circuit to receive the common-polarity pulses, means for enabling said sampling gate at the end of each integration by said keyed-filtering means to pass one of said common-polarity pulses; a phase storage and detector circuit, including a stable oscillator, a plurality of binary frequency dividers connected in tandem with said oscillator, a reset input provided with each of said binary dividers and being connected to an output of said sampling gate, N-number of differentiating circuits respectively connected to outputs of said binary dividers, with said N-number of differentiating circuits providing phase detector information in binary coded pulsed form, the last of said dividers having an output frequency equal to the received tone, the last divider having a second reset input for resetting its output to a state opposite from its reset input connected to said sampling gate, a reset-correction gate having an output connected to the second reset input of said last divider, one input of said correction gate connected to said pulse forming means to receive pulses having said first polarity, and enabling-input means of said correction gate connected to said sampling gate to obtain the same enablement as said sampling gate, with demodulated information in binary-number form being provided from said differentiating circuits at the instances of resetting of said dividers.

15. A circuit as defined in claim 14 in which said one-pulse sampling gate comprises a coincidence gate having an output providing the output of said sampling gate and having one input being the input of said sampling gate, a flip-flop circuit having an output connected to another input of said coincidence gate, a delay means connected between the output of said coincidence gate and an input of said flip-flop circuit, a sampling-timing source connected to another input of said flip-flop to trigger it at the ends of the integrations by said keyed-filtering means, and said enabling input means of said reset-correction gate being connected to the output of said flip-flop circuit.

16. A demodulator as defined in claim 15 in which said pulse-forming means comprises an amplitude limiter having an input connected to an output of said keyed-filtering means for forming square waves, a differentiating circuit connected to the output of said amplitude limiter to form pulses of first and second polarity from the positive-going and negative-going axis-crossings of the square wave, first and second pulse separators for respectively segregating pulses having the first and second polarity, said pulse separators being connected to said differentiating circuit, means for inverting the polarity of pulses from said second separators, means for combining inverted pulses with pulses from said first separator to provide common-polarity pulses, and the output of the second separator being connected to said one input of said reset correction gate.

17. A demodulator as defined in claim 16 including a plurality of storage flip-flops, a plurality of "and" gates each having a pair of inputs, with one input of each gate connected to a different one of said differentiating circuits, the other input of each gate connected to the output of said flip-flop circuit in the one-pulse sampling gate, each of said storage flip-flops having resetting and setting inputs, the setting inputs of each of said storage flip-flops connected to an output of a different one of said "and" gates, a storage-actuating differentiating circuit connected between said sampling-timing source and the resetting input of each of said storage flip-flops, the outputs of said storage flip-flops providing the encoded information in bits stored approximately over a period of said sampling-timing pulses.

18. A demodulator as defined in claim 17 including decoding means comprising at least a first and second shaping flip-flops, each having setting and resetting inputs, a driving-timing source, first, second and third pairs of "and" gates, differentiating means connecting one input of each "and" gates to said drive-timing source, the outputs of said first pair of "and" gates being connected to the setting and resetting inputs of said first shaping flip-flop, inverted and non-inverted outputs being provided by each of said storage flip-flops, another input to each of said first pair of "and" gates being connected respectively to the inverted and non-inverted outputs of one of said storage flip-flops receiving the output of the last divider, an additional pair of inputs being provided for each "and" gate in said second and third pairs, said additional inputs being connected in permuted order to the outputs of two of said storage flip-flops, a first "or" gate connecting outputs of said second pair of "and" gates to the setting input of said second shaping flip-flop, and a second "or" gate connecting outputs of said third pair of "and" gates to the resetting input of said second shaping flip-flop, whereby said shaping flip-flops provide decoded and shaped signal outputs for a pair of channels.

References Cited in the file of this patent

UNITED STATES PATENTS

| | | |
|---|---|---|
| 2,510,983 | Krause | June 13, 1950 |
| 2,610,295 | Carbrey | Sept. 9, 1952 |
| 2,752,491 | Ringoen | June 26, 1956 |
| 2,778,933 | Crist | Jan. 22, 1959 |
| 2,905,812 | Doelz et al. | Sept. 22, 1959 |
| 2,905,837 | Barry | Sept. 22, 1959 |